(12) United States Patent
Jones

(10) Patent No.: US 12,327,930 B2
(45) Date of Patent: Jun. 10, 2025

(54) MULTI-BAND MILLIMETER WAVE (MMW) ANTENNA ARRAYS

(71) Applicant: T-Mobile USA, Inc., Bellevue, WA (US)

(72) Inventor: David Jones, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 131 days.

(21) Appl. No.: 17/037,289

(22) Filed: Sep. 29, 2020

(65) Prior Publication Data

US 2022/0102857 A1  Mar. 31, 2022

(51) Int. Cl.
| | |
|---|---|
| H01Q 5/342 | (2015.01) |
| H01Q 1/52 | (2006.01) |
| H01Q 21/06 | (2006.01) |
| H01Q 21/28 | (2006.01) |
| H01Q 21/30 | (2006.01) |
| H04B 7/06 | (2006.01) |

(52) U.S. Cl.
CPC .............. *H01Q 5/342* (2015.01); *H01Q 1/523* (2013.01); *H01Q 21/061* (2013.01); *H01Q 21/28* (2013.01); *H01Q 21/30* (2013.01); *H04B 7/0613* (2013.01)

(58) Field of Classification Search
CPC ...... H01Q 5/342; H01Q 1/523; H01Q 21/061; H01Q 21/28; H01Q 21/30; H04B 7/0613
See application file for complete search history.

(56) References Cited

U.S. PATENT DOCUMENTS

| | | | | |
|---|---|---|---|---|
| 5,220,334 A | * | 6/1993 | Raguenet | H01Q 9/20 343/793 |
| 5,434,580 A | * | 7/1995 | Raguenet | H01Q 5/42 343/700 MS |
| 5,703,601 A | * | 12/1997 | Nalbandian | H01Q 9/0414 343/846 |
| 5,861,848 A | * | 1/1999 | Iwasaki | H01Q 9/0435 343/769 |
| 6,166,692 A | * | 12/2000 | Nalbandian | H01Q 9/0428 343/770 |
| 6,211,841 B1 | * | 4/2001 | Smith | H01Q 1/246 343/797 |
| 6,831,615 B2 | * | 12/2004 | Gottl | H01Q 1/246 343/810 |
| 7,405,710 B2 | * | 7/2008 | Bisiules | H01Q 3/26 343/797 |
| 7,692,601 B2 | * | 4/2010 | Bisiules | H01Q 21/24 343/803 |
| 8,269,687 B2 | * | 9/2012 | Lindmark | H01Q 21/061 343/893 |
| 9,112,758 B2 | | 8/2015 | Niu et al. | |
| 9,924,375 B1 | * | 3/2018 | Park | H04B 7/022 |

(Continued)

*Primary Examiner* — Dameon E Levi
*Assistant Examiner* — Bamidele A Immanuel

(57) ABSTRACT

This disclosure describes techniques that enable individual antenna arrays of a base station node to transmit digital information via a plurality of frequency bands. More specifically, a remote radio unit (RRU) may include a first set of antenna arrays and a second set of antenna arrays. Each set of antenna arrays comprise antenna elements that are configured for use with different frequency bands. In this way, the RRU, via the first and second sets of antenna arrays, may be configured for simultaneous use with different frequency bands.

20 Claims, 4 Drawing Sheets

(56) References Cited

U.S. PATENT DOCUMENTS

| | | | |
|---|---|---|---|
| 10,170,838 B2* | 1/2019 | Garcia | H01L 23/66 |
| 10,971,803 B2* | 4/2021 | Bane | H01Q 1/48 |
| 10,992,057 B2* | 4/2021 | Avser | H01Q 21/065 |
| 2002/0140616 A1* | 10/2002 | Kanamaluru | H01Q 5/42 |
| | | | 343/756 |
| 2004/0155820 A1* | 8/2004 | Sreenivas | H01Q 5/42 |
| | | | 343/700 MS |
| 2004/0196203 A1* | 10/2004 | Lier | H01Q 21/067 |
| | | | 343/824 |
| 2004/0252071 A1* | 12/2004 | Bisiules | H01P 5/103 |
| | | | 343/797 |
| 2007/0008236 A1* | 1/2007 | Tillery | H01Q 21/30 |
| | | | 343/810 |
| 2007/0205955 A1* | 9/2007 | Korisch | H01Q 21/08 |
| | | | 343/797 |
| 2008/0111757 A1* | 5/2008 | Bisiules | H01Q 5/42 |
| | | | 343/803 |
| 2008/0266181 A1* | 10/2008 | Ying | H01Q 9/36 |
| | | | 343/700 MS |
| 2010/0283702 A1* | 11/2010 | Lindmark | H01Q 5/42 |
| | | | 343/810 |
| 2012/0014697 A1* | 1/2012 | Zhao | H01Q 21/28 |
| | | | 398/115 |
| 2012/0133569 A1* | 5/2012 | Pivit | H01Q 1/246 |
| | | | 343/844 |
| 2012/0200449 A1* | 8/2012 | Bielas | H01Q 3/2605 |
| | | | 342/372 |
| 2012/0262359 A1* | 10/2012 | Baliarda | H01Q 21/08 |
| | | | 343/893 |
| 2012/0280880 A1* | 11/2012 | Arvidsson | H01Q 1/246 |
| | | | 343/810 |
| 2013/0072247 A1* | 3/2013 | Park | H04L 5/0057 |
| | | | 455/513 |
| 2014/0062826 A1* | 3/2014 | Jonsson | H01Q 21/062 |
| | | | 343/893 |
| 2014/0182811 A1* | 7/2014 | Hager | H01Q 1/02 |
| | | | 165/104.34 |
| 2014/0204846 A1* | 7/2014 | Maltsev | H04W 92/045 |
| | | | 370/329 |
| 2014/0242930 A1* | 8/2014 | Barker | H01Q 21/26 |
| | | | 343/893 |
| 2015/0002361 A1* | 1/2015 | Pu | H01Q 1/246 |
| | | | 343/853 |
| 2015/0070234 A1* | 3/2015 | Jones | H01Q 21/28 |
| | | | 343/797 |
| 2015/0222013 A1* | 8/2015 | Choi | H04B 7/02 |
| | | | 343/879 |
| 2015/0263435 A1* | 9/2015 | Song | H01Q 21/24 |
| | | | 343/810 |
| 2015/0325923 A1* | 11/2015 | Hiramatsu | H01Q 9/16 |
| | | | 343/815 |
| 2015/0372396 A1* | 12/2015 | Sienkiewicz | H01Q 1/246 |
| | | | 455/77 |
| 2015/0372397 A1* | 12/2015 | Jonsson | H01Q 1/246 |
| | | | 343/835 |
| 2016/0352003 A1* | 12/2016 | Puente | H01Q 5/42 |
| 2017/0025749 A1* | 1/2017 | Frye | H01Q 21/062 |
| 2017/0244159 A1* | 8/2017 | Moon | H01Q 5/42 |
| 2017/0294715 A1* | 10/2017 | Wu | H01Q 21/28 |
| 2018/0026379 A1* | 1/2018 | Barker | H01Q 21/24 |
| | | | 344 |
| 2018/0233820 A1* | 8/2018 | Chen | H01Q 21/205 |
| 2018/0254545 A1* | 9/2018 | Hendrix | H01Q 21/0025 |
| 2018/0261910 A1* | 9/2018 | Puente | H01Q 21/08 |
| 2018/0294567 A1* | 10/2018 | O'Brien | H01Q 13/206 |
| 2018/0301801 A1* | 10/2018 | Hojjat | H01Q 9/16 |
| 2018/0323512 A1* | 11/2018 | Hong | H01Q 17/008 |
| 2019/0089448 A1* | 3/2019 | Jakobsson | H04B 1/40 |
| 2019/0123426 A1* | 4/2019 | Bryce | H01Q 21/061 |
| 2019/0173177 A1* | 6/2019 | Johansson | H01Q 1/246 |
| 2019/0312337 A1* | 10/2019 | Farzaneh | H01Q 21/30 |
| 2019/0386393 A1* | 12/2019 | Chiang | H01Q 5/28 |
| 2020/0021019 A1* | 1/2020 | Rajagopalan | H01Q 1/2291 |
| 2020/0212600 A1 | 7/2020 | Gonzalez et al. | |
| 2020/0259248 A1* | 8/2020 | Lv | H01Q 21/061 |
| 2022/0013920 A1* | 1/2022 | Komov | H01Q 21/062 |

* cited by examiner

MULTI-BAND MILLIMETER WAVE (MMW) ANTENNA ARRAYS

BACKGROUND

Telecommunication service providers may own and operate more than one frequency band at a time within a given geographic region. To support their operations, base station nodes are typically required to deploy multiple frequency bands at any given time. Base station nodes typically include three sectors to service a service area that extends radially from the base station node. In order to deploy one frequency band, the base station node requires three remote radio units (RRU)—one for each of the three sectors. Accordingly, if the base station node is to deploy multiple frequency bands, the number of RRUs increases by the corollary multiple of three.

Current 5G-New Radio (5G-NR) millimeter wave (mmW) frequency bands use separate dedicated RRUs for each band. Most 5G-NR-enabled client devices are capable of operating on most, if not all 5G-NR mmW frequency bands, either singularly or via carrier aggregation. However, as the number of 5G-NR mmW frequency bands increase, so too does the number of RRUs required at each base station node.

The corollary of an increase in RRUs is physical space congestion on a base station tower. Each RRU requires a physical hardware installation on a base station site/tower. As the number of RRUs increase, the physical space available on the base station tower is proportionally reduced. In addition, the operating expenditures (OPEX) and capital expenditures (CAPEX) associated with additional RRUs also increase. In the event that a base station site/tower does not have enough physical space for additional RRUs, then the frequency bands that correspond to the additional RRUs cannot be deployed, which prevents a service provider from deploying additional spectrum assets. In turn, this leads to a reduction in spectral efficiency and may negatively impact user experience, which sometimes may be very significantly.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
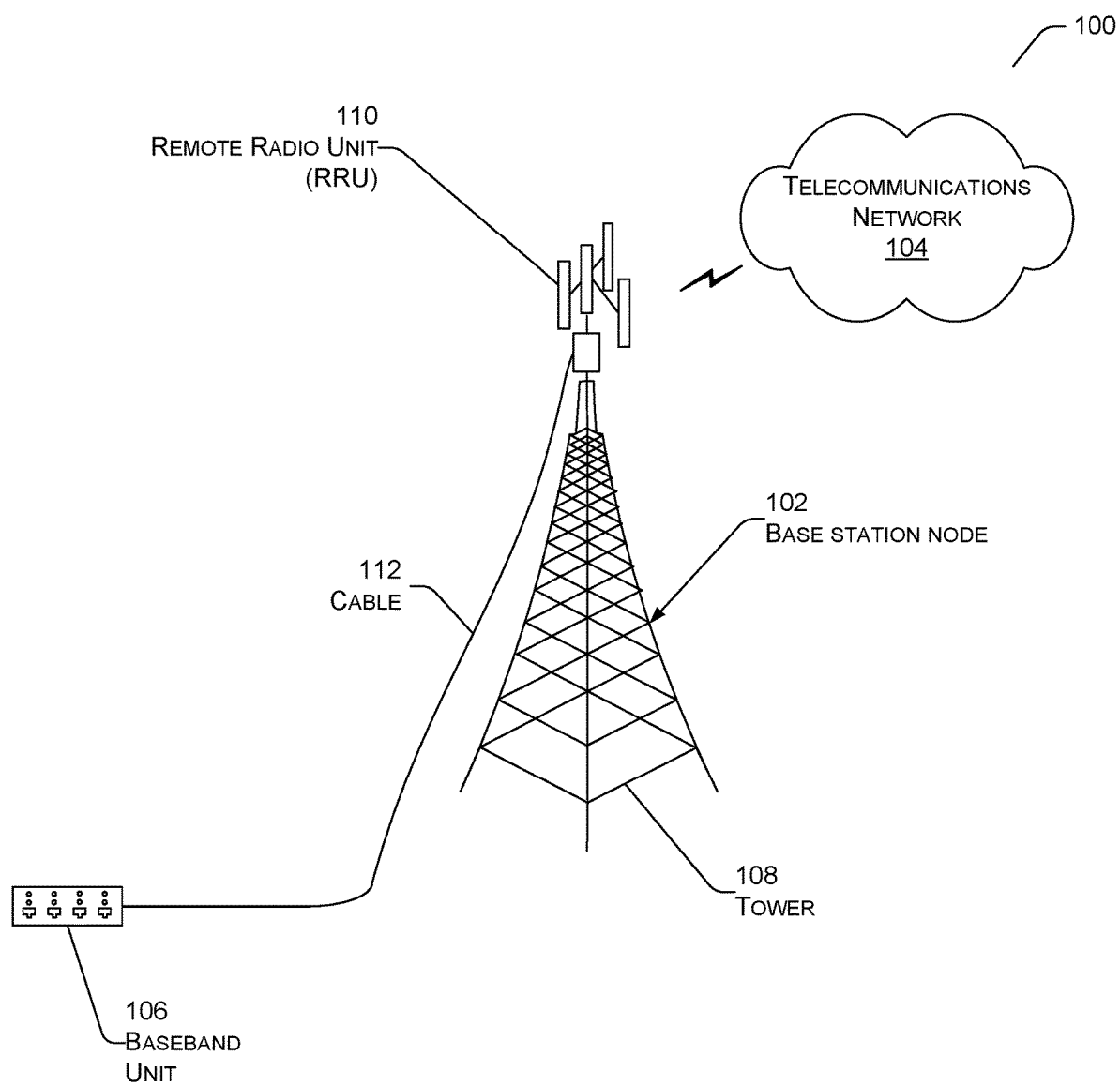
FIG. 1 illustrates an example architecture of a base station node with a remote radio unit (RRU) configured to support multiple frequency bands.

This disclosure describes techniques that enable individual antenna arrays of a base station node to transmit digital information via one or more frequency bands. More specifically, a remote radio unit (RRU) is described that may include a plurality of antenna arrays that service multiple frequency bands. The RRU may be configured to service multiple frequency bands across antenna arrays, within antenna array, or a combination of both.

The ability to service multiple frequency bands within a single RRU is intended to ease physical congestion on a base station tower. As the number of 5G-NR mmW frequency bands increase, so too does the number of RRUs required at each base station node. Since each RRU requires a physical hardware installation on a base station tower, as the number of RRUs increase, the physical space available on the base station tower is proportionally reduced. In addition, the operating expenditures (OPEX) and capital expenditures (CAPEX) associated with additional RRUs also increase. Therefore, this disclosure describes techniques that are intended to ease the physical space burden on base station towers, by reducing the number of RRU hardware installations required to service a growing number of 5G-NR mmW frequency bands.

In one example, an RRU may include a plurality of antenna arrays. Each antenna array may be configured to service a single frequency band, and each antenna array may service different frequency bands relative to one another. Therefore, an aggregate of antenna arrays that each service different frequency bands may effectively create a multi-band RRU.

In another example, the RRU may include at least one antenna array that comprises antenna elements that service different frequency bands. Each antenna element may be configured to service a single frequency band. However, an aggregate of antenna elements within an antenna array that service different frequency bands may effectively create a multi-band RRU.

More specifically, this disclosure describes an RRU of a base station node that comprises at least a first set of antenna arrays and a second set of antenna arrays. The first set of antenna arrays may be configured for use with a first frequency band, and the second set of antenna arrays may be configured for use with a second frequency band that is different from the first frequency band. In this way, the RRU, through the simultaneous use of the first and second sets of antenna arrays, may be configured to service the first frequency band and the second frequency band either one band at a time or both at the same time. In some examples, the first and second frequency bands may correspond to different mmW bands associated with a 5G-NR air-interface technology. In other examples, the first and/or second frequency bands may correspond to frequency bands associated with a 2G, 3G, LTE air-interface technology.

Moreover, the RRU may include an antenna array that comprises antenna elements that are configured for use with multiple frequency bands. In other words, rather than being configured to service a single frequency band, the antenna array may service different frequency bands based on the frequency bands serviced by the in situ antenna elements.

An antenna array with multiple sets of antenna elements that service different frequency bands may have one set of antenna elements interspersed within the spacing of another set of antenna elements. The spacing between antenna elements is inversely proportional to the frequency band in which the antenna elements serve. For example, the optimum antenna element spacing for a 48 GHz frequency is 50% of the spacing for a 24 GHz frequency band. Therefore, if an antenna array is to comprise of multiple sets of antenna elements, the geometric arrangement of antenna elements is based on the relative frequencies that each set of antenna elements serve. For example, a first set of antenna elements associated with a first frequency may be interspersed within the spacing of a second set of antenna elements associated with second frequency, provided the first frequency (i.e. 48 GHz) is relatively higher than the second frequency (i.e. 24 GHz). If the first frequency (i.e. 48 GHz) is relatively higher than the second frequency (i.e. 24 GHz), then the corresponding first set of antenna elements requires less relative spacing between antenna elements and thus can be interspersed between the relatively larger spacing that is required of the second set of antenna elements that serves the second frequency (i.e. 24 GHz).

Moreover, rather than interspersing a first set of antenna elements within the spacing of a second set of antenna elements, the first set may be stacked above the second set, such that the first set overlays the second set in a third geometric dimension. In this example, the first and second sets of antenna elements remain coplanar with one another. Further, the first set of antenna elements that overlay above the second set of antenna elements may incorporate RF transparency holes that permit the frequency band associated with the underlying second set of antenna elements to pass through the first set of antenna elements. In this way, despite one set of antenna elements overlaying another, the incorporation of RF transparency holes ensures that both sets of antenna elements can service their respective frequency bands.

In some examples, an RRU may include antenna arrays that serve three or more frequency bands. For example, consider an antenna array that services three different frequency bands. Here, the antenna array may include three sets of antenna elements, with each set corresponding to one of the three different frequency bands. One set of antenna elements may be outlaid within the array in a grid pattern. The spacing between the antenna elements may be a function of the frequency band served. Further, a second set of antenna elements associated with a relatively higher, second frequency band may be interspersed within the spacing between the antenna elements of the first set of antenna elements. Moreover, the third set of antenna elements associated with the third frequency band may overlay the first or second sets of antenna elements. The third set of antenna elements may include RF transparency holes within each antenna element to ensure the underlying antenna element can service their respective frequency bands.

It is noteworthy that the terms "frequency bands" and "spectrum" are used interchangeably throughout this disclosure.

FIG. 1 illustrates an example architecture of a base station node with a remote radio unit (RRU) configured to support multiple frequency bands. The base station node 102 is responsible for handling voice and data traffic associated with a telecommunications network 104. The telecommunications network 104 may correspond to one of a 2G, 3G, Long-term Evolution (LTE), or 5G-NR network. The base station node 102 may include a baseband unit 106, tower 108, and one or more RRUs 110.

It is noteworthy that each RRU 110 may share hardware and software elements across all serviced frequency bands. Shared resources may include enclosures, power supplies, cable interfaces, baseband and digital processing, interface elements, and so forth, across multiple frequency bands. The degree of resource sharing may relate to the average or maximum total bandwidth or throughput associated with the RRU 110. In turn, by sharing resources, operational and capital expenditure associated with a RRU 110 is reduced, along with a reduction in cabling that extends from the base to the top of the tower 108.

The RRU 110 is configured to receive digital information and control signals from the baseband unit 106 and further modulate the digital information into a radio frequency (RF) signal. The RRU 110 may also receive RF signals, demodulate the RF signals, and supply the demodulated signals to the baseband unit 106.

Moreover, the RRU 110 may be configured in one of two ways to support multiple frequency bands. Firstly, the RRU 110 may include multiple single-band antenna arrays that each service a different frequency band. Alternatively, or additionally, the RRU 110 may include at least one antenna array that comprises single band antenna elements that each service different frequency bands.

In the illustrated example, the RRU 110 may be located at the top of the tower 108 to reduce signal loss between the RRU 110 and antenna arrays that transmit the RF signals. In this disclosure, the antenna arrays are depicted as part of the RRU 110, however, in other embodiments, the antenna arrays and the RRU 110 may be physically distinct. The RRU 110 is communicatively coupled to the baseband unit 106 via a cable 112 that extends from the baseband unit 106, up the tower 108, and to the RRU 110. The cable 112 may be a hybrid connector system (HCS) cable that combines fiber communications (i.e. fiber optic cable connected to the baseband unit 106).

Figure 2:
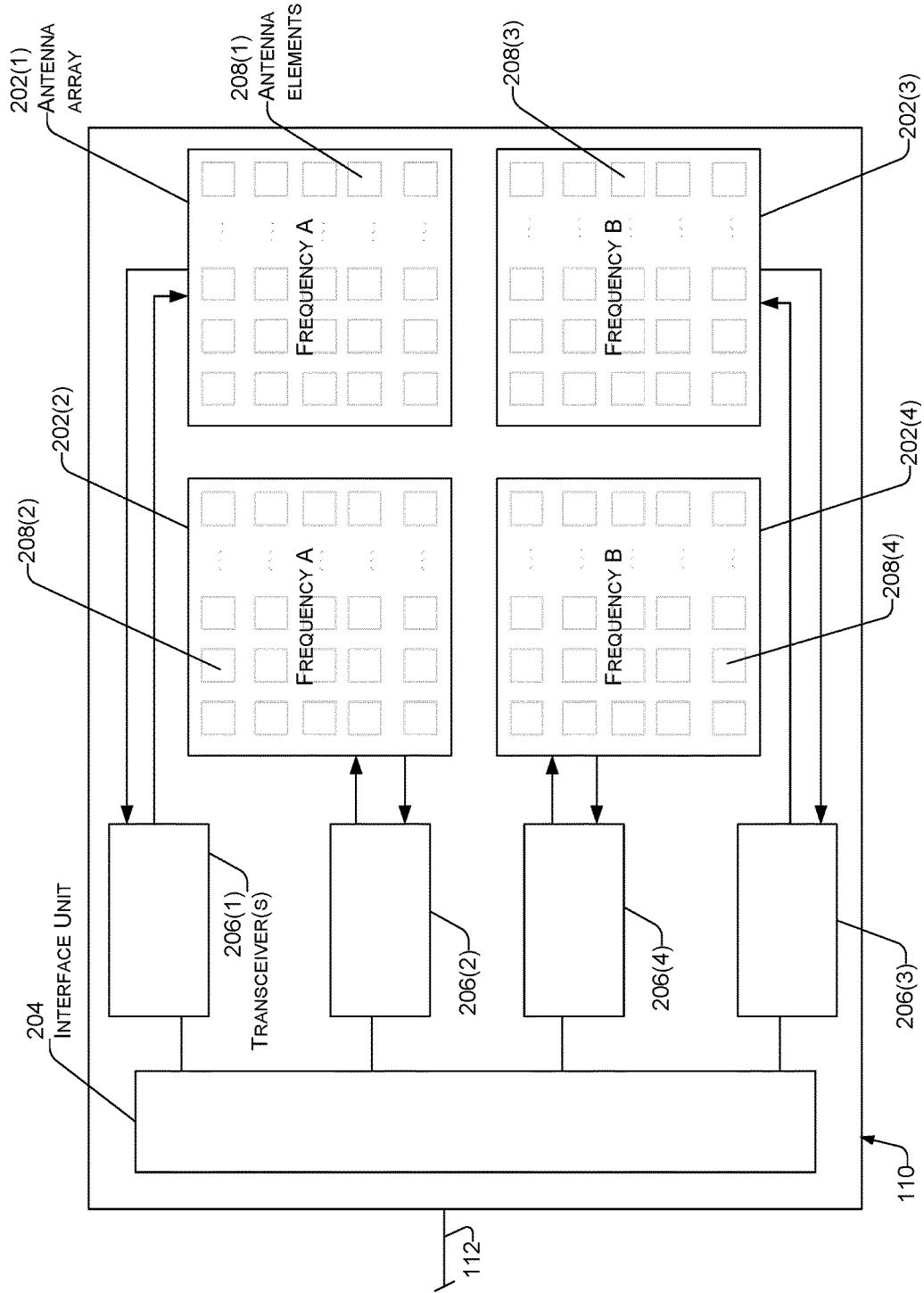
FIG. 2 illustrates an RRU that is configured with single-band antenna arrays that service different frequency bands.

FIG. 2 illustrates an embodiment of an RRU that is configured with single-band antenna arrays that service different frequency bands. In the illustrated example, the RRU 110 is configured to support "Frequency A" and "Frequency B" across multiple antenna arrays, whereby "Frequency A" is different from "Frequency B". More specifically, antenna array(s) 202(1) and 202(2) are configured to service "Frequency A," and antenna array(s) 202(3) and 202(4) are configured to service "Frequency B." While FIG. 2 depicts an RRU 110 with four antenna arrays, one of ordinary skill in the art may appreciate that further variations and modifications can be made such that any number of antenna arrays may be incorporated within the RRU 110. Further, "Frequency A" and "Frequency B" may correspond to the 2G spectrum, 3G spectrum, LTE spectrum, or 5G-NR spectrum (i.e. 5G-NR mmW spectrum).

The RRU 110 may be configured to receive digital information and control signals from the baseband unit 106 via cable 112, and further modulate the digital information into a radio frequency (RF) signal that is transferred through to one of the antenna array(s) 202(1)-202(4). The RRU 110 may also receive RF signals from one of the antenna array(s) 202(1)-202(4), demodulate the RF signals, and supply the demodulated signals to the baseband unit 106.

The RRU 110 may include an interface unit 204, antenna array(s) 202(1)-202(4), and transceiver(s) 206(1)-206(4). The interface unit 204 is communicatively coupled to the baseband unit 106 via the cable 112 and to the transceiver(s) 206(1)-206(4) of the RRU 110. Accordingly, the interface unit 204 may be configured to receive the digital information and control signals from the baseband unit 106. In doing so, the interface unit 204 may route the digital information to one of the transceiver(s) 206(1)-206(4) based on the corresponding control information.

The transceiver(s) 206(1)-206(4) may be communicatively coupled to the interface unit 204 and the antenna array(s) 202(1)-202(4). Each of the transceiver(s) 206(1)-206(4) is tasked with modulating digital information received from the interface unit 204 into RF signals and demodulating RF signals received from the antenna array(s) 202(1)-202(4) into digital information. The digital information is then transmitted to the interface unit 204 for further transmission to baseband unit 106. At each of the transceiver(s) 206(1)-206(4), the modulation and demodulation of RF signals is based on the frequency bands supported by the counterpart antenna array(s) 202(1)-202(4) to which the transceiver(s) 206(1)-206(4) are coupled. For example, transceiver 206(1) may be configured to modulate and demodulate RF signals associated with antenna array 202(1) and so forth.

The antenna array(s) 202(1)-202(4) are communicatively coupled to counterpart transceiver(s) 206(1)-206(4). For example, antenna array 202(1) is communicatively coupled to transceiver 206(1) and so forth. As discussed above, each of the antenna array(s) 202(1)-202(4) are configured to receive modulated RF signals from their counterpart transceiver(s) 206(1)-206(4) and transmit RF signals to their counterpart transceiver(s) 206(1)-206(4) for demodulation.

Each of the antenna array(s) 202(1)-202(4) may comprise a set of multiple connected antenna element(s) 208(1)-208(4) which work together as a single antenna, to transmit or receive RF signals. Each antenna element radiates an RF signal that is combined and superposed and added together to enhance the power radiated in desired directions. The shape of each antenna array 202(1)-202(4) may be square, rectangular, triangular, or any other geometric shape that is conducive to the transmission and receipt of RF signals.

The antenna element(s) 208(1)-208(4), as discussed above, are the components of the antenna array(s) 202(1)-202(4), which in combination, transmit or receive RF signals in a desired direction. The number of antenna elements is typically inversely proportional to the size of the antenna elements, themselves. Further, the element size is typically greater than a wavelength. Also, the spacing between antenna elements is inversely proportional to the frequency. For example, the ideal antenna element spacing for a 48 GHz frequency band is 50% of the spacing for a 24 GHz frequency band. Further, it follows that the area of antenna elements for a 48 GHz frequency band is 25% of the area for a 24 GHz frequency band.

Even though FIG. 2 illustrates a square grid arrangement of antenna elements within an antenna array, one of ordinary skill in the art may appreciate that further variations and modifications can be made such that the arrangement of antenna elements within an antenna may correspond to a rectangular grid pattern, triangular grid pattern, or even a random grid arrangement may be used.

In the illustrated example, the antenna array 202(1) comprises antenna element(s) 208(1), which are configured to service "Frequency A." Each of the antenna element(s) 208(1) are single band antenna elements, meaning that the antenna elements are configured to service one frequency band, namely "Frequency A." The corollary of antenna array 202(1) comprising antenna element(s) 208(1) is that antenna array 202(1) is a single band antenna array that is configured to service "Frequency A."

Similarly, antenna array 202(2) comprises antenna element(s) 208(2), which are configured to service "Frequency A." Therefore, antenna array 202(2) is a single band antenna array that is configured to service "Frequency A."

In contrast, the antenna array 202(3) comprises antenna element(s) 208(3), which are configured to service "Frequency B." Each of the antenna element(s) 208(3) are single band antenna elements, meaning that the antenna elements are configured to service one frequency band, namely "Frequency B." The corollary of antenna array 202(3) comprising antenna element(s) 208(3) is that antenna array 202(3) is a single band antenna array that is configured to service "Frequency B."

Similarly, antenna array 202(4) comprises antenna element(s) 208(4), which are configured to service "Frequency B." Therefore, antenna array 202(4) is a single band antenna array that is configured to service "Frequency B."

While the RRU 110 comprises single-band antenna arrays that service one of "Frequency A" or "Frequency B", namely antenna array(s) 202(1)-202(4), the aggregate of the four antenna array(s) 202(1)-202(4) effectively creates a multi-band RRU 110 that services "Frequency A" and "Frequency B."

Figure 3:
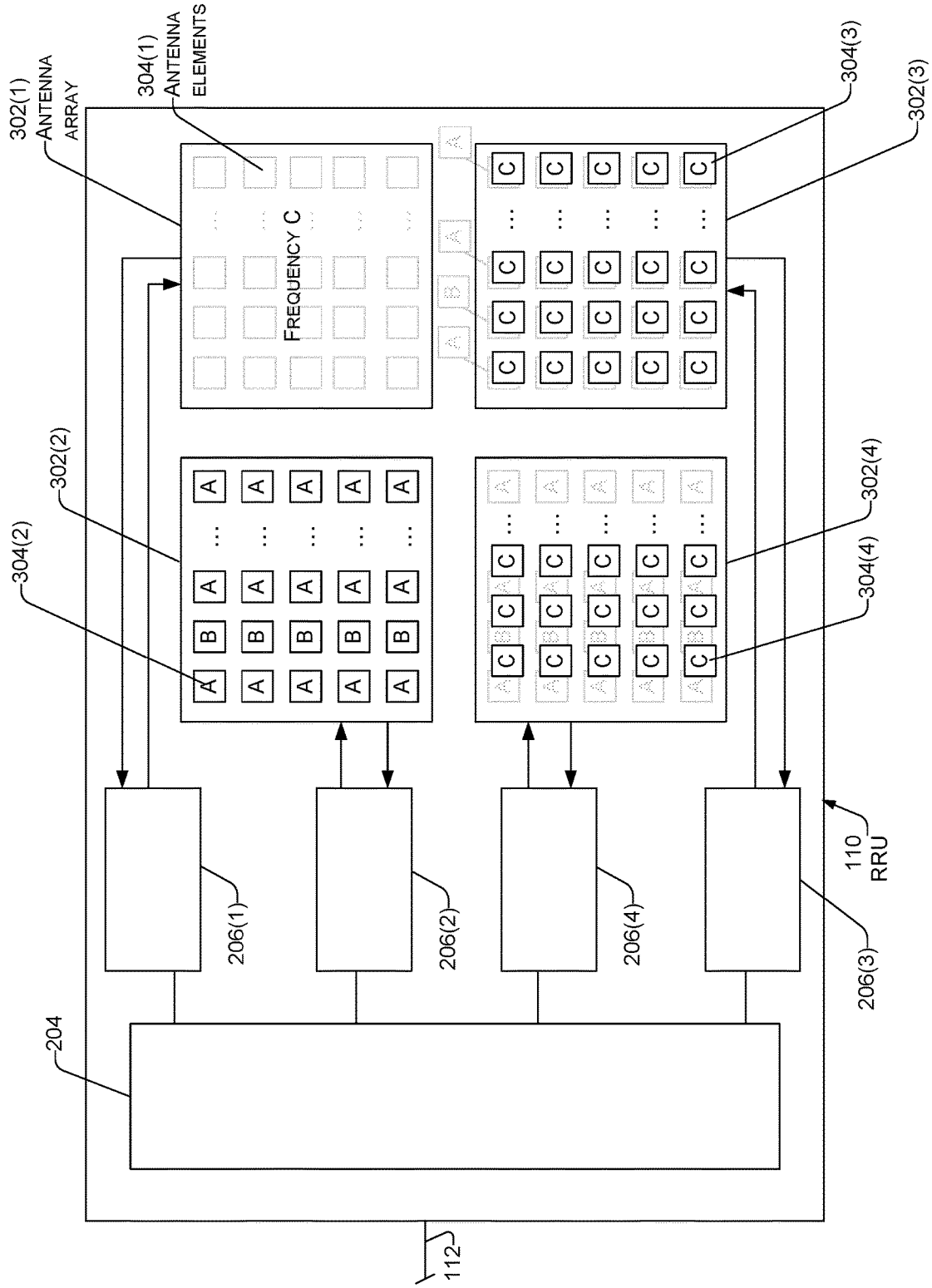
FIG. 3 illustrates an RRU that is configured with a combination of single and multiband antenna arrays that service different frequency bands.

FIG. 3 illustrates an RRU that is configured with a combination of single and multiband antenna arrays that service different frequency bands. More specifically, FIG. 3 illustrates an RRU 110 with three embodiments of a multi-band antenna array and one single band antenna array. While FIG. 3 depicts an RRU 110 with three multiband antenna arrays and one single band antenna, one of ordinary skill in the art may appreciate that further variations and modifications can be made such that the RRU 110 may include any number of multiband antenna arrays and single-band antenna arrays.

Moreover, FIG. 3 includes various details relating to the RRU 110 that were previously described with reference to FIG. 2. As such, for brevity and ease of description, various details relating to the RRU 110 have been omitted herein to the extent that the same or similar details have been provided with reference to FIG. 2.

In the illustrated example, the RRU 110 is configured to service "Frequency A," "Frequency B," "Frequency C," and "Frequency D." Each of the four enumerated frequency bands is different from one another and may correspond to the 2G spectrum, 3G spectrum, LTE spectrum, or 5G-NR spectrum (i.e. 5G-NR mmW spectrum).

In the illustrated example, the RRU 110 includes an antenna array 302(1), which is configured to service "Frequency C." Similar to the embodiment depicted in FIG. 2, antenna array 302(1) comprises antenna element(s) 304(1), which are configured to service "Frequency C." Each of the antenna element(s) 304(1) are single band antenna elements, meaning that the antenna element(s) 304(1) are configured to service one frequency band, namely "Frequency C."

Moreover, FIG. 3 illustrates an antenna array 302(2), which is configured to service "Frequency A" and "Frequency B." Unlike antenna array 302(1), antenna array 302(2) is a multiband antenna array. More specifically, antenna array 302(2) comprises antenna element(s) 304(2) that service one of "Frequency A" or "Frequency B". The antenna element(s) 304(2) themselves are single band, meaning that they are configured to service one frequency band, namely "Frequency A" or "Frequency B".

In the illustrated example, a subset of antenna element(s) 304(2) that service "Frequency B" may be interspersed between another subset than service "Frequency A." Depending on the required spacing between antenna elements, the antenna elements of each frequency band subset may be positioned within the antenna array 302(2) in alternating order, or variation thereof.

For example, the order of the antenna element(s) 304(2) within the antenna array 302(2) may be "Frequency A" antenna element, "Frequency B" antenna element, "Frequency A" antenna element, and so forth. However, any alternating order may be possible, based at least in part on the magnitude of the served frequencies. For example, the spacing between antenna elements is inversely proportional to the frequency band in which the antenna elements serve. Consider the antenna element spacing for two subsets of antenna elements that serve a 48 GHz frequency band and a 24 GHzGHz frequency band. In this example, the antenna element spacing for a 48 GHz frequency is 50% of the spacing required for a 24 GHz frequency band. Therefore, it is conceivable for a positional order of antenna elements within an antenna array to include one 24 GHz antenna element, followed by two 48 GHz antenna elements, and a next 24 GHz antenna element.

Further, FIG. 3 illustrates an antenna array 302(3), which is configured to service "Frequency A," and "Frequency C." Similar to antenna array 302(2), but unlike antenna array 302(1), antenna array 302(3) is a multiband antenna array. Moreover, antenna array 302(2) comprises antenna element(s) 304(3) that service one of "Frequency A" or "Frequency C." The antenna element(s) 304(2) themselves are single band, meaning that each antenna element is configured to serve one frequency band, namely "Frequency A" or "Frequency C".

In the illustrated example, a subset of the antenna element(s) 304(3) that service "Frequency C" may overlay another subset of the antenna element(s) 304(3) that service "Frequency A." In this example, the subsets of the antenna element(s) 304(3) remain coplanar with one another. While FIG. 3 illustrates one subset of antenna element(s) 304(3) (i.e. serving "Frequency C") overlaying the antenna element(s) of the other, underlying subset of antenna elements (i.e. serving "Frequency A"), one of ordinary skill in the art may appreciate that, based on the required antenna element spacing associated with the serviced frequency bands, further variations and modifications can be made such that the overlay of antenna elements occurs intermittently, or in some cases, is staggered to overlay the spacing between the underlying antenna elements.

Moreover, and as described in more detail with reference to FIG. 4, the subset of overlaid antenna element(s) (i.e. serving "Frequency C") may include RF transparency holes that permit the frequency band associated with the underlying subset of antenna elements (i.e. serving "Frequency A") to pass through the subset of overlaid antenna element(s) (i.e. serving "Frequency C").

Additionally, FIG. 3 illustrates an antenna array 302(4) that combines the antenna element arrangement of antenna array 302(2) and 302(3) to service "Frequency A," "Frequency B," and "Frequency C." Similar to antenna array 302(2) and 302(3), but unlike antenna array 302(1), antenna array 302(4) is a multiband antenna array. The antenna element(s) 304(4) themselves are single band, meaning that each antenna element is configured to serve one frequency band, namely "Frequency A," "Frequency B," or "Frequency C".

In the illustrated example, a first subset of the antenna element(s) 304(4) that service "Frequency B" may be interspersed between a second subset that service "Frequency A." While FIG. 3 illustrates an alternating order between antenna elements that service "Frequency A" and "Frequency B," any order may be possible, based at least in part on the magnitude of the served frequencies (i.e. "Frequency A" and "Frequency B").

Antenna array 302(4) further includes a third subset of the antenna element(s) 304(4) that service "Frequency C." In this example, the third subset is shown to overlay the first and second subsets that service "Frequency B" and "Frequency A," respectively. Moreover, unlike antenna array 302(3), the positioning of the third subset of antenna element(s) 304(4) is staggered to overlay the spacing between the underlying antenna elements, namely the first and second subsets. In this way, the third subset of the antenna element(s) 304(4) may avoid the inclusion of RF transparency holes, since the underlying antenna elements may have an exposed path to transmit/receive RF signals via the spacing between the overlaid antenna element(s) (i.e. serving "Frequency C").

Figure 4:
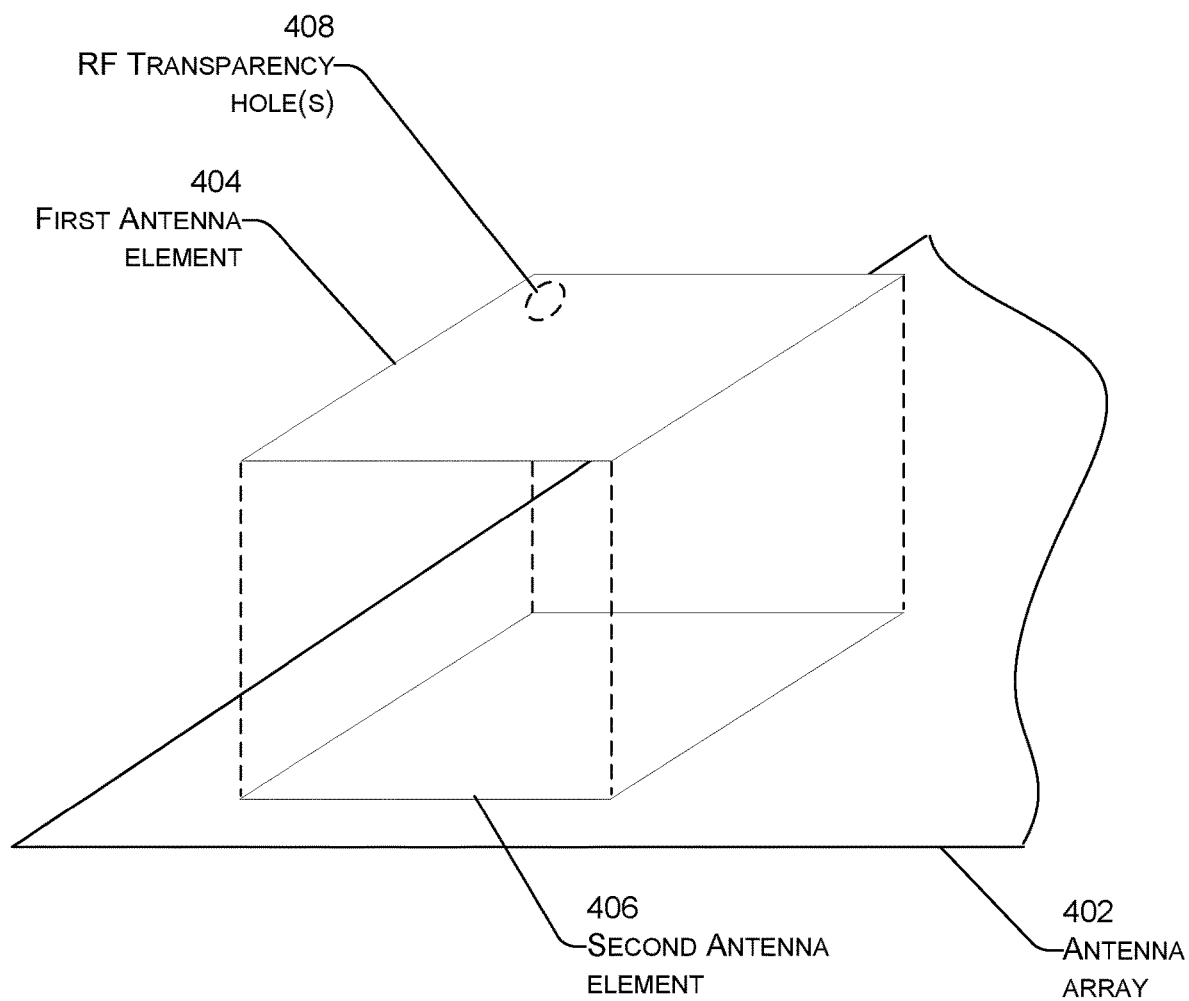
FIG. 4 illustrates an antenna array that comprises a first antenna element with an RF transparency hole that is overlaid above a second, underlying antenna element.

FIG. 4 illustrates an antenna array that comprises a first antenna element with an RF transparency hole that is overlaid above a second, underlying antenna element. In the illustrated example, an antenna array 402 may include a first antenna element 404 that serves a first frequency band and a second antenna element 406 that services a different, second frequency band. As shown in FIG. 4, the first antenna element 404 may be configured to positionally overlay the second antenna element 406. The first antenna element 404 may remain coplanar with the second antenna element 406.

Moreover, the first antenna element 404 (i.e. serving the first frequency band) may include one or more RF transparency hole(s) 408 that permit RF signals associated with the underlying, second antenna element 406 (i.e. serving the second frequency band) to pass through the first antenna element 404. Alternatively, rather than including RF transparency hole(s) 408 in the first antenna element 404, the overlay position of the first antenna element 404 may be staggered relative to the underlying, second antenna element 406, such that the second antenna element 406 may have an exposed path to transmit/receive RF signals via the space created by the staggered and overlaid, first antenna element 404.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A remote radio unit, comprising:
    an antenna array that comprises:
        a first antenna element that is configured to transmit and receive over-the-air electromagnetic waves that are within a first frequency band, that is flat, that defines a first plane, and that defines a hole that is configured to pass over-the-air electromagnetic waves that are within a second frequency band that is different than the first frequency band; and
        a second antenna element that is configured to transmit and receive over-the-air electromagnetic waves that are within the second frequency band that is different than the first frequency band, that is flat, and that defines a second plane that is parallel to the first plane,
    wherein an axis that is perpendicular to the first plane and the second plane intersects the first antenna element and the second antenna element,
    wherein the first frequency band corresponds to millimeter wave band signals associated with 5G-New Radio (5G-NR) air-interface technology, and
    wherein the second frequency band corresponds to signals associated with 2G, 3G, or LTE air-interface technology.

2. The remote radio unit of claim 1, wherein the antenna array comprises a third antenna element that is configured to transmit and receive over-the-air electromagnetic waves that are within a third frequency band that is different than the first and second frequency bands, and wherein the antenna array is configured for simultaneous transmission or reception of over-the-air electromagnetic waves that are within the first frequency band and the third frequency band.

3. The remote radio unit of claim 2, wherein:
the antenna array includes additional first antenna elements and additional third antenna elements, and
the first antenna element and the additional first antenna elements are interspersed between the third antenna element and the additional third antenna elements.

4. The remote radio unit of claim 1, wherein the first antenna element and the second antenna element are configured for simultaneous transmission or reception of over-the-air electromagnetic waves that are within the first frequency band and the second frequency band.

5. The remote radio unit of claim 1, further comprising:
an interface unit configured to receive digital information and control signals from a baseband unit;
a first transceiver communicatively coupled to the interface unit and the first antenna element, the first transceiver configured to convert the digital information to the first frequency band based at least in part on the control signals; and
a second transceiver communicatively coupled to the interface unit and the second antenna element, the second transceiver configured to convert the digital information to the second frequency band based at least in part on the control signals.

6. The remote radio unit of claim 1, wherein the first antenna element is a single-band antenna element.

7. An antenna system, comprising:
an antenna array comprising:
a first antenna element that is configured to transmit and receive over-the-air electromagnetic waves that are within a first frequency band, that is flat, and that defines a first plane;
another first antenna element that is configured to transmit and receive over-the-air electromagnetic waves that are within the first frequency band, that is flat, that is located in the first plane, and that is located a first distance from the first antenna element;
a second antenna element that is configured to transmit and receive over-the-air electromagnetic waves that are within a second frequency band that is different from the first frequency band, that is flat, and that is located in the first plane;
another second antenna element that is configured to transmit and receive over-the-air electromagnetic waves that are within the second frequency band that is different from the first frequency band, that is flat, that is located in the first plane, and that is located a second distance from the second antenna element; and
a third antenna element that is configured to transmit and receive over-the-air electromagnetic waves that are within a third frequency band that is different from the first frequency band and the second frequency band, that defines a second plane that is parallel to the first plane, and that defines a first hole that is configured to pass over-the-air electromagnetic waves that are within the first frequency band,
wherein a first axis that is perpendicular to the first plane and the second plane intersects the first antenna element and the third antenna element,
wherein a second axis that is perpendicular to the first plane and the second plane intersects the second antenna element and the third antenna element,
wherein frequencies in the second frequency band equal a first product of frequencies in the first frequency band and a factor,
wherein the first distance equals a second product of the second distance and the factor, and
wherein the first antenna element or the other first antenna element, the second antenna element or the other second antenna element, and the third antenna element are configured for simultaneous use with the first frequency band, the second frequency band, and the third frequency band.

8. The antenna system of claim 7, further comprising an interface unit configured to receive digital information and control signals from a baseband unit, wherein the digital information is routed to one or more transceivers that are communicatively coupled to the antenna array based on the control signals.

9. The antenna system of claim 7, wherein the antenna array comprises:
additional first antenna elements that are configured to transmit and receive over-the-air electromagnetic waves that are within the first frequency band, that are flat, that are located the first distance from each other, and that are located in the first plane; and
additional second antenna elements that are configured to transmit and receive over-the-air electromagnetic waves that are within the second frequency band, that are flat, that are located the second distance from each other, and that are located in the first plane,
wherein the first antenna element, the other first antenna element, and the additional first antenna elements are interspersed between the second antenna element, the other second antenna element, and the additional second antenna elements, and
wherein a first number of the second antenna element, the other second antenna element, and the additional second antenna elements is twice a second number of the first antenna element, the other first antenna element, and the additional first antenna elements.

10. The antenna system of claim 9, wherein:
the first antenna element, the other first antenna element, and the additional first antenna elements are identical,
the second antenna element, the other second antenna element, and the additional second antenna elements are identical, and
the first antenna element, the other first antenna element, the additional first antenna elements, the second antenna element, the other second antenna element, and the additional second antenna elements are arranged in a grid with alternating rows of (i) the first antenna element, the other first antenna element, and the additional first antenna elements and (ii) the second antenna element, the other second antenna element, and the additional second antenna elements.

11. The antenna system of claim 7, wherein at least one of the first frequency band, the second frequency band, or the third frequency band corresponds to millimeter wave band signals associated with 5G-New Radio (5G-NR) air-interface technology.

12. The antenna system of claim 7, further comprising one or more transceivers that modulate digital information received from an interface unit into the over-the-air electromagnetic waves.

13. The antenna system of claim 7, wherein the third antenna element defines an additional hole that is configured to pass over-the-air electromagnetic waves that are within the second frequency band.

14. The antenna system of claim 13, wherein:
a third axis that is perpendicular to the first plane and the second plane intersects the first antenna element and the hole of the third antenna element, and
a fourth axis that is perpendicular to the first plane and the second plane intersects the second antenna element and the additional hole of the third antenna element.

15. The antenna system of claim 7, wherein the first frequency band includes signals with a frequency of 24 GHz and the second frequency band includes signals with a frequency of 48 GHZ.

16. A base station node, comprising:
a Remote Radio Unit (RRU) that includes an interface unit, a set of transceivers, an antenna array that comprises:
a first antenna element that is configured to transmit and receive over-the-air electromagnetic waves that are within a first frequency band, that is flat, that defines a first plane, and that defines a hole that is configured to pass of over-the-air electromagnetic waves that are within a second frequency band that is different than the first frequency band; and
a second antenna element that is configured to transmit and receive over-the-air electromagnetic waves that are within the second frequency band that is different than the first frequency band, that is flat, and that defines a second plane that is parallel to the first plane,
wherein an axis that is perpendicular to the first plane and the second plane intersects the first antenna element and the second antenna element,
wherein the first frequency band corresponds to millimeter wave band signals associated with 5G-New Radio (5G-NR) air-interface technology, and
wherein the second frequency band corresponds to signals associated with LTE air-interface technology; and
a baseband unit communicatively coupled to the RRU, the baseband unit configured to transmit digital information and control signals to the interface unit of the RRU.

17. The base station node of claim 16, wherein the first antenna element and the second antenna element are single-band antenna elements.

18. The base station node of claim 16, wherein the set of transceivers are configured to convert the digital information to the first frequency band or the second frequency band, based at least in part on the control signals.

19. The base station node of claim 16, wherein the antenna array further comprises:
additional second antenna elements; and
a third antenna elements,
wherein individual ones of the second antenna element and the additional second antenna elements are interspersed between individual ones of the third antenna elements, and
wherein the third antenna elements are configured to transmit and receive over-the-air electromagnetic waves that are within another frequency band that is different from the first and second frequency bands.

20. The base station node of claim 16, wherein at least one of the first frequency band or the second frequency band corresponds to millimeter wave band signals associated with 5G-New Radio (5G-NR) air-interface technology.

* * * * *